US006911169B2

(12) United States Patent
Kwag et al.

(10) Patent No.: US 6,911,169 B2
(45) Date of Patent: Jun. 28, 2005

(54) CARBON FIBER-REINFORCED COMPOSITE MATERIAL AND METHOD OF MAKING

(75) Inventors: Choongyong Kwag, Troy, MI (US); Gary George Tibbetts, Birmingham, MI (US); D. Gerald Glasgow, Centerville, OH (US)

(73) Assignee: General Motors Corporation, Detroit, MI (US)

( * ) Notice: Subject to any disclaimer, the term of this patent is extended or adjusted under 35 U.S.C. 154(b) by 303 days.

(21) Appl. No.: 10/315,500

(22) Filed: Dec. 9, 2002

(65) Prior Publication Data

US 2004/0108617 A1 Jun. 10, 2004

(51) Int. Cl.$^7$ ................................................ B29C 45/00
(52) U.S. Cl. ........................ 264/108; 264/105; 264/349; 264/328.18
(58) Field of Search ............................... 264/105, 108, 264/349, 328.18

(56) References Cited

U.S. PATENT DOCUMENTS

| | | | |
|---|---|---|---|
| 4,994,220 A | * | 2/1991 | Gutjahr et al. ................. 264/69 |
| 5,024,818 A | | 6/1991 | Tibbetts et al. ............... 422/158 |
| 5,374,415 A | | 12/1994 | Alig et al. ................. 423/447.3 |
| 5,413,773 A | | 5/1995 | Tibbetts et al. ............ 423/447.3 |
| 5,433,906 A | | 7/1995 | Dasch et al. ................. 264/117 |
| 5,614,312 A | * | 3/1997 | Tucker et al. ................. 428/323 |
| 5,853,865 A | | 12/1998 | McHugh et al. ............ 428/297.4 |
| 5,887,225 A | * | 3/1999 | Bell .............................. 399/90 |
| 6,673,864 B2 | * | 1/2004 | Patel et al. .................. 524/494 |

FOREIGN PATENT DOCUMENTS

| | | | |
|---|---|---|---|
| WO | WO 98/20503 | 5/1998 | ........... H01B/1/24 |

* cited by examiner

Primary Examiner—Michael P. Colaianni
Assistant Examiner—Monica A. Fontaine
(74) Attorney, Agent, or Firm—Kathryn A. Marra

(57) ABSTRACT

A method of making a composite article of a graphite-filled polymer mixture that is robust during high shear mixing and compounding, and that exhibits relatively low electrical resistivity after molding. The mixture is formed by shear mixing a liquid polymeric material, graphitized carbon fibers having diameters of less than one micrometer, and glass fibers longer than the carbon fibers. The carbon and glass fibers constitute up to about 25 volume percent and up to about 50 weight percent, respectively, of the mixture, though the addition of as little as about 1 weight percent of the glass fibers has been shown to dramatically reduce resistivity. The mixture is then introduced into a mold so that the glass fibers are substantially oriented parallel to the direction of flow. Due at least in part to the glass fibers being larger than the carbon fibers, the carbon fibers are substantially aligned with the glass fibers and preferentially segregate to regions of the polymeric matrix near interfaces between the polymeric matrix and the glass fibers.

17 Claims, 3 Drawing Sheets

CARBON FIBER-REINFORCED COMPOSITE MATERIAL AND METHOD OF MAKING

STATEMENT REGARDING FEDERALLY SPONSORED RESEARCH

This invention was made with Government support under Agreement No. 70NANB5H1173 awarded by NIST. The Government has certain rights in the invention.

CROSS REFERENCE TO RELATED APPLICATIONS

Not applicable.

BACKGROUND OF THE INVENTION (1) Field of the Invention

The present invention generally relates to carbon fiber-filled composite materials and their processing methods. More particularly, this invention relates to such composites with very small diameter carbon fibers dispersed in a polymer matrix, and in which glass fibers are dispersed and oriented to promote alignment of the carbon fibers, with the effect that electrical resistivity of the composite is reduced.

(2) Description of the Related Art

Composite materials of filler materials dispersed in a polymeric matrix are known to exhibit mechanical properties such as stiffness, strength and toughness, and physical properties such as coefficient of thermal expansion and electrical and thermal conductivities, which are superior to the polymeric matrix alone. An example is carbon fiber-filled polymer-based composite materials that have found use in both the automotive and aerospace industries due to their ability to exhibit desirable mechanical, electrical and thermal properties. To increase fiber strength, carbon fibers may undergo a thermal treatment referred to as graphitizing, such that the fibers are in the form of graphite.

Carbon fibers are often produced by the pyrolysis of long polyacrylonitrile (PAN), pitch or rayon-fibers. In this method, a suitable PAN, pitch or rayon is produced as a continuous fiber that is oxidized, carbonized and perhaps graphitized to form carbon or graphite fibers. The fibers are typically very long, and therefore must be chopped to a suitable length that may vary from a few millimeters to a few centimeters or longer. Carbon fibers produced by this method are generally at least about one micrometer in diameter, and more often on the order of several micrometers or more in diameter.

U.S. Pat. No. 5,024,818 to Tibbetts et al., assigned to the assignee of this invention, teaches a method and apparatus by which carbon fibers can be catalytically grown by a vapor deposition process from hydrocarbons. The vapor-grown carbon fibers produced by this method are generally nanometer-size (i.e., less than about one micrometer in diameter), typically on the order of about 200 nm, and are significantly smaller than carbon fibers produced by conventional methods. In addition, the fibers are relatively short, with lengths typically on the order of about 40 to about 200 micrometers, and perhaps as small as five micrometers or less. Therefore, the fibers are generally too small to allow the properties of the individual fibers to be measured directly. Though their high surface area and large stiffness make them too fragile for many types of production mixers, such as twin screw extruders, vapor-grown carbon fibers of the type produced by Tibbetts et al. have been used as additives in carefully fabricated thermoplastic composites.

Electrical conductivity is a necessary property for applications such as charge dissipation, electrostatic painting, radio frequency interference and fuel cell plates. Carbon fiber-filled polymer-based composite materials can be sufficiently electrically conductive for such applications, particularly those filled with vapor-grown carbon fibers because smaller fiber diameters are able to achieve suitable electrical conductivities with only a small volume fraction of fibers added. Minimizing the fiber content of a composite reduces material and processing costs while also avoiding degradation of composite properties such as impact resistance. However, a difficulty is encountered when vapor-grown carbon fibers are incorporated using high shear bulk fabrication techniques suitable for large volume production processes. An example is a twin screw extruder whose high shearing forces tend to break carbon fibers, destroying the interconnections between fibers that are necessary for thermal and electrical conductivity through the composite. Such an undesirable effect is particularly seen with small-diameter vapor-grown carbon fibers, whose high surface area and stiffness render the fibers too fragile for many types of production mixers. The result is a composite whose electrical resistivity is significantly higher than what can be achieved with a relatively gentle low-volume mixing technique, and may exceed the allowable level for the particular application, such as about $10^6$ Ohm×cm for electrostatic painting applications. While higher carbon fiber contents of 15 volume percent or more can reduce resistivity, such composites are more difficult to process and can exhibit unacceptable mechanical properties.

In view of the above, alternative composite compositions have been considered. In an article entitled "New Injection Moldable Electrostatic Dissipative (ESD) Composites Based on Very Low Carbon Black Loadings," Journal of Electrostatics 47 (1999), p. 201–214, polymer-based composites are formed by combining polymeric materials with glass fibers and carbon black. The article, authored by Narkis et al., reports resistivities of as low as about $10^6$ Ohm×cm when the composite contains a single polymeric material (polypropylene), glass fibers and carbon black. WO98/20503 to Narkis et al. discloses producing electrostatically dissipative polymer-based composites from thermoplastics modified with carbon black and glass fibers. WO98/20503 reports composites were produced having a matrix of a first thermoplastic material (e.g., polypropylene) and containing a second thermoplastic material (e.g., polyamide) and a dispersion of carbon black and glass fibers. According to WO98/20503, resistivities of as low as 0.1 Ohm×cm are possible if the second thermoplastic material has a higher polarity than the first thermoplastic material, such that the second thermoplastic material has an affinity for the glass fibers and the carbon black have an affinity to the second thermoplastic material, resulting in the carbon black forming an electrically conductive network within the matrix along the surfaces of the glass fibers. However, the lowest reported resistivity is 2 Ohm×cm.

It would be desirable if other methods were available by which carbon fiber-filled composites can be produced that exhibit improved electrical properties and suitable mechanical properties for electrical applications.

BRIEF SUMMARY OF THE INVENTION

The present invention provides a method of making a composite article characterized by suitable mechanical, electrical and thermal properties for automotive and aerospace applications. In particular, the method makes use of a graphite-filled polymer mixture that is robust during high shear mixing and compounding, and can be molded to produce a polymer-based composite article whose electrical resistivity is considerably reduced.

The method of this invention generally includes shear mixing a mixture comprising a liquid polymeric material, graphitized carbon fibers having diameters of less than one micrometer, and glass fibers longer than the carbon fibers. The carbon and glass fibers constitute up to about 25 volume percent and up to about 50 weight percent, respectively, of the mixture, though the addition of as little as about 1 weight percent of the glass fibers has been shown to dramatically reduce resistivity. The mixture is then flowed into a mold so that the glass fibers are substantially oriented parallel to the direction of flow. Due at least in part to the glass fibers being larger than the carbon fibers, the carbon fibers become substantially aligned with the glass fibers and preferentially segregate to regions of the polymeric material near interfaces between the polymeric material and the glass fibers. The composite article formed in the mold can have an electrical resistivity of not greater than $10^6$ Ohm×cm in the direction of flow, preferably below $10^3$ Ohm×cm and potentially as low as about 0.1 Ohm×cm.

To achieve resistivities of as low as about 0.1 Ohm×cm, the method of this invention makes use of nanometer-size vapor-grown graphitized carbon fibers, and makes possible a polymer-based composite article with a sufficiently low electrical resistivity for electrical applications. Though their high surface area and stiffness have made such carbon fibers too fragile for many types of production mixers, such as twin screw extruders, the addition of a small fraction of glass fibers to a mixture of a polymer and graphitized carbon fibers appears to make the fiber-polymer mixture more robust during high shear mixing and compounding, and results in considerably reduced electrical resistivity of the resulting polymer-based composite, such as by a factor of about 20 in some mixtures. Notably, the benefits of this invention are achieved without the need for adding a second and higher-polarity thermoplastic material to the composite, as taught and required by WO98/20503.

Other objects and advantages of this invention will be better appreciated from the following detailed description.

DETAILED DESCRIPTION OF THE INVENTION

Figure 1:
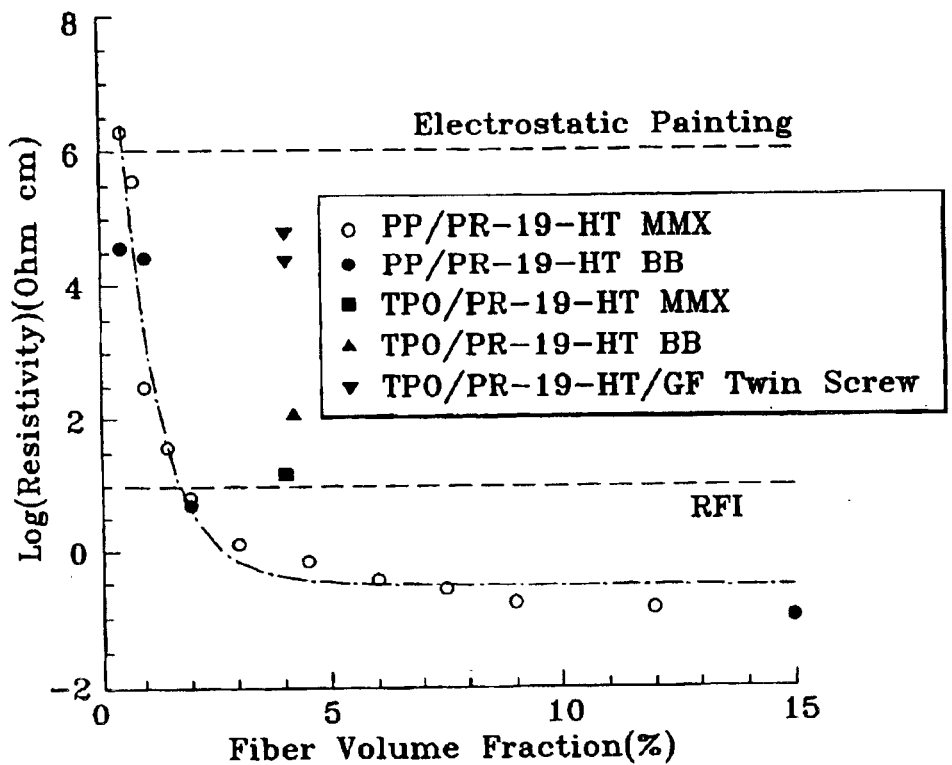
FIG. 1 is a graph showing resistivities measured in the flow direction of polymer-based composites having varying volume fractions of graphitized carbon fibers prepared by several methods.

The present invention provides a method for forming a polymer-based composite article using vapor-grown carbon fibers, such as of the type grown in accordance with U.S. Pat. No. 5,024,818 to Tibbetts et al. Carbon fibers formed in accordance with Tibbetts et al. are characterized by a diameter of less than one micrometer, such as about 200 nanometers and less, and a length of as little as about five micrometers and less. As will be discussed below, an important aspect of the carbon fibers is that they have undergone a graphitizing heat treatment in accordance with known practices. While the above dimensional characteristics of the preferred carbon fibers can be obtained in accordance with the teachings of Tibbetts et al., other methods could be foreseeably employed to produce suitable nanometer-sized carbon fibers.

Suitable processes for preparing graphitized carbon fibers for use with this invention include graphitizing the fibers at an elevated temperature in a flowing inert gas. For example, the fibers may be baked at about 3000EC for a duration of at least fifteen minutes, though shorter durations are permissible. In addition, surface treatments known in the art for enhancing the wettability of carbon fibers may be desirable under certain conditions.

Suitable polymers for the composite materials of this invention are generally thermoplastic resins, with preferred resins being polypropylene (PP), thermoplastic olefin (TPO), nylon and polycarbonate, each of which has been found to bond sufficiently to the nano-sized carbon fibers employed in the invention. Thermoplastic resins do not cross-link irreversibly when heated above their respective melting points, such that processing of composite mixtures in accordance with this invention can be carried out at temperatures that are sufficient to melt the resin and significantly lower the viscosity of the mixture, and for a duration sufficient to ensure that the carbon fibers are adequately dispersed by the thermoplastic resin.

In a series of investigations leading up to the invention, carbon-filled polymer-based composite materials were evaluated to determine their electrical conductivity (resistivity) and the robustness of the carbon fibers during high shear processing. The polymers used in the investigations were a polypropylene (PP) available in flake form under the name Montel Pro-Fax 6301 from Montel, and a thermoplastic olefin (TPO) available under the name CA 287A, also from Montel. Carbon fibers used in the investigation were produced by Applied Sciences, Inc., using a vapor deposition process in accordance with U.S. Pat. Nos. 5,024,818, 5,374,415 or 5,413,773 to Tibbetts et al. Several varieties of the fibers, commercially available under the name PYROGRAF, were produced at different gas space velocities using various feed gas mixtures. The fibers were approximately 200 nm in diameter with an initial aspect ratio exceeding 100. PYROGRAF PR-19 fibers were produced at high gas space velocity with a natural gas feedstock. PYROGRAF PR-19-HT fibers were produced identically to the PR-19 fibers, but heat treated to above 3000EC in bulk to graphitize the fibers. All fibers used in the investigations were debulked using a water-based treatment in order to facilitate handling and incorporation into the polymer matrix.

All composite specimens evaluated in this investigation were produced by injection molding with a bench-top injection molder commercially available under the name CS-183 MiniMax Molder from Custom Scientific Instruments, Inc. The injection molder was equipped with a cylindrical mixing cup (about 12.7 mm in diameter and about 25.4 mm in height) and a rotating and vertically moving rotor for mixing and injection. The mixing cup temperature was maintained at about 230EC for specimens in which polypropylene was the polymer matrix material, and about 225EC specimens in which TPO was the polymer matrix material. The mold, which produced rectangular bars having approximate dimensions of 12.7×70×3.3 mm, was held at room temperature for both polypropylene and TPO. Some of the specimens evaluated in the investigations were formed by loading and melting pellets of the chosen polymer into the mixing cup, after which the fiber constituent(s) for the composite material was gradually added to the mixing cup containing the polymer melt and the resulting mixture blended (shear mixed) by rotational and vertical motions of the rotor. The resulting mixtures were then injected into the mold by opening a valve connecting the mixing cup and the mold while vigorously pushing downward a lever attached to the rotor. Following injection, the mold was immediately submerged in cold water for at least five minutes to minimize additional crystal growth during solidification.

As will be explained below, mixtures for other composite specimens underwent more vigorous mixing with a Brabender Plasti-Coder® DIGI system (C. W. Brabender Instruments, Inc.) prior to molding with the MiniMax Molder. The Brabender system was equipped with an approximately 30 cm$^3$ mixing chamber and two internal mixing blades. As in the case of the MiniMax molder, the polymer was initially fed into the Brabender mixing chamber and melted prior to loading the fiber constituent. The resulting composite mixtures were transferred into the preheated mixing cup of the MiniMax Molder and injection molded without further mixing.

The specimens obtained by injection molding were lightly sanded in order to smooth their surfaces for measuring electrical resistivity. Volume resistivity was measured using a Keithley 2000 electrometer (Keithley Instruments, Inc.) at room temperature. Resistivities in the flow and transverse directions were measured by connecting electrodes attached by silver paint to appropriate surfaces of the specimens. For resistivities over $10^4$ Ohm×cm, a two-point measurement was accurate, while four-point measurements were performed for those specimens with lower resistivities. In order to measure resistivities in the thickness (thinnest) direction, square specimens (about 12.7×12.7×3.3 mm) were cut from the rectangular specimens and held between two flat copper plates connected to the electrometer.

In a first investigation, composite specimens were produced with either polypropylene or TPO as the polymer matrix material. The polypropylene (PP) specimens were mixed with varying amounts of the PR-19-HT graphite fibers, and the TPO specimens were mixed with about 4 volume percent of the PR-19-HT graphite fibers. Some of the composites were blended under relatively gentle, low-shear mixing conditions with the MiniMax molder, while others were more vigorously but carefully blended with the Brabender system. FIG. 1 shows collected resistivity data (measured in the flow direction) for the specimens as a function of volume fraction of fibers added. Note that for composites formed of polypropylene and blended in either the MiniMax molder (MMX) or the Brabender system (BB) exhibited a resistivity of just over $10^6$ Ohm×cm when as little as about 0.5 volume percent of the graphite fibers was added. A resistivity of about $10^6$ Ohm×cm is of significance to the invention as being required for certain electrical applications, such as electrostatic painting. In contrast, specimens produced by blending with the MiniMax with TPO as the polymer matrix material exhibited resistivities of greater than the polypropylene specimens by a factor of more than 20. TPO specimens exhibited even higher resistivities if blended with the Brabender system prior to molding with the MiniMax molder.

Additional TPO specimens were then produced with a twin screw extruder to achieve higher shear mixing than possible with the Brabender mixer. Following molding in the MiniMax molder, resistivities for these specimens were measured at levels above $10^9$ Ohm×cm (and therefore off the graph of FIG. 1). Additional TPO specimens were then blended with the twin screw extruder to contain the same 4 volume percent content of graphite fibers in the TPO matrix, but with the addition of about 1 weight percent chopped glass fibers obtained from Johns Manville and having a nominal diameter of about 14 micrometers and processed to have an average length of about 3.2 mm. Surprisingly, these composite specimens exhibited resistivities under $10^6$ Ohm×cm.

Figure 2:
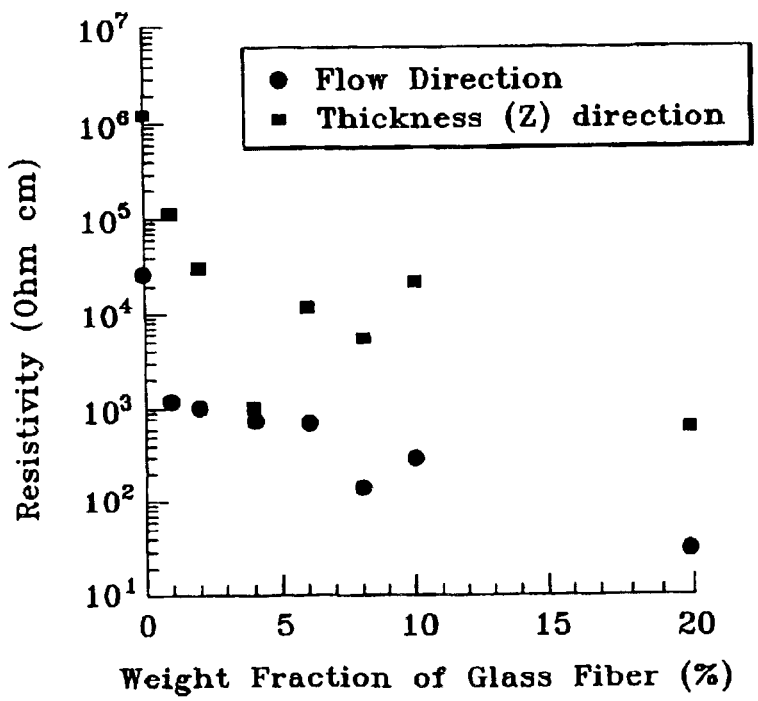
FIG. 2 is a graph showing resistivities measured in both the flow and thickness directions in polymer-based composites containing about 1 volume percent graphitized carbon fibers and varying amounts of chopped glass fibers in accordance with the present invention.

In view of the above results, a second investigation was undertaken to produce polypropylene specimens compounded to contain graphite and varying amounts of glass fibers blended with the Brabender mixer and molded with the MiniMax molder. The specimens contained about 1 volume percent of the PR-19-HT graphitized fibers and up to about 20 weight percent of chopped glass fibers identical to those used in the first investigation. FIG. 2 shows resistivities measured in the flow and thickness directions of the specimens as varying with the amount of glass fiber content. Notably, FIG. 2 evidences that an addition of as little as about 1 weight percent of the glass fibers lowered the resistivity in both the flow and thickness directions by more than a factor of 10 below the resistivity values for specimens not containing glass fiber. Despite some scatter in the data, it can be seen that increasing the fraction of glass fibers monotonically decreased resistivity up through additions of about 20 weight percent glass fibers. Resistivities in the flow direction were at least about 30 times smaller than resistivities measured in the thickness direction. This result was concluded to be due to better glass fiber orientation in the flow direction.

Figure 3:
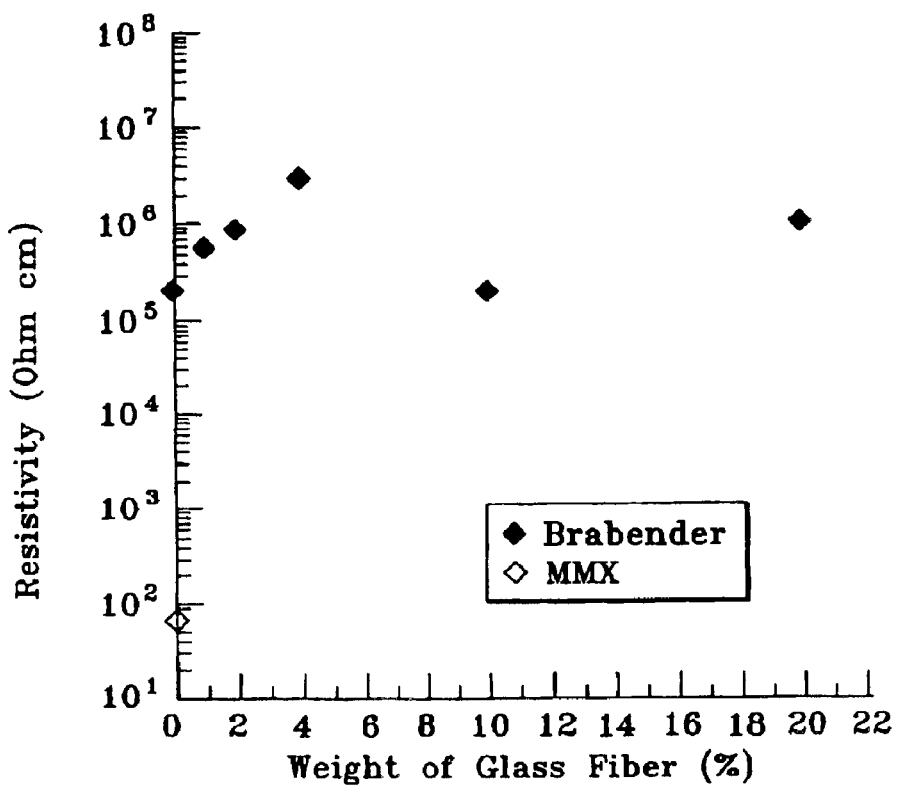
FIG. 3 is a graph showing resistivities measured in the flow direction in polymer-based composites containing about 3 volume percent carbon fibers and varying amounts of glass fibers prepared by several methods.

The conductivity enhancement observed with the specimens represented by FIG. 2 was not observed for the PYROGRAF PR-19 fibers, which were not subjected to a high-temperature heat treatment and therefore not graphitized. FIG. 3 shows resistivities measured in the flow direction for polypropylene composite specimens containing about 3 volume percent of the PR-19 fibers and varying amounts of the same glass fibers used in specimens of FIG. 2. Lower amounts of the PR-19 fibers were added to specimens whose resistivities were higher than $10^8$ Ohm×cm, and therefore not represented in FIG. 3. As indicated in FIG. 3, specimens were blended and molded with the MiniMax molder, or blended with the Brabender mixer and then molded with the MiniMax molder. From these results, it was concluded that the Brabender mixer was destructive to the fibers to the extent that the composite specimens exhibited resistivities higher than the specimens of FIG. 2 by over three orders of magnitude. Surprisingly, the addition of up to 20 weight percent of the glass fibers did not appear to have any clear effect on resistivity. From this investigation, it was concluded that heat treated (graphitized) carbon fibers are required in order to achieve improved conductivity using the production shear mixing techniques being investigated.

Figure 4:
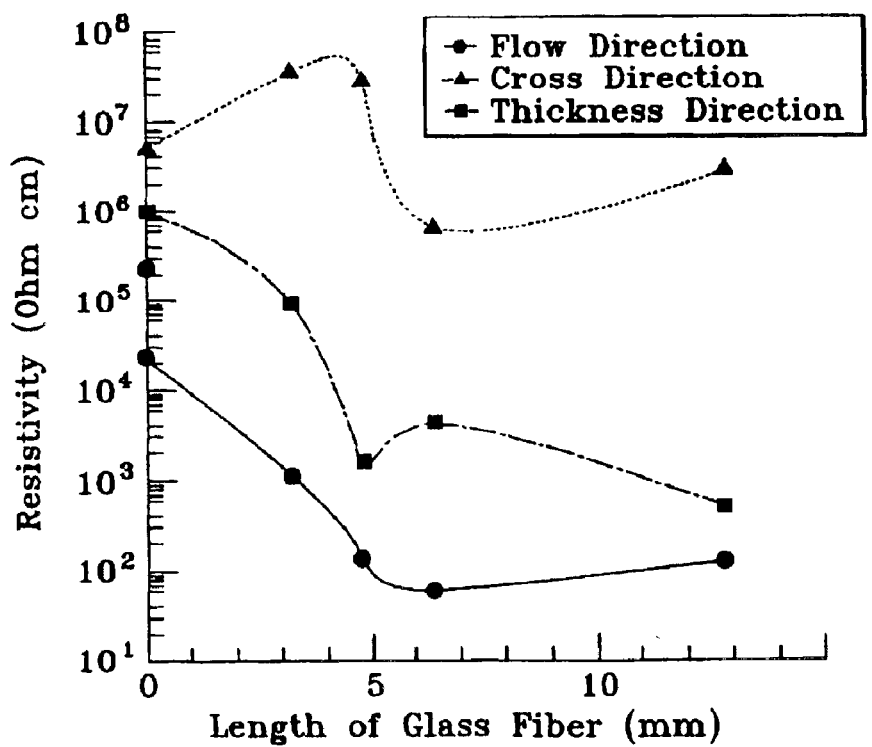
FIG. 4 is a graph showing resistivities of polymer-based composites containing about 1 volume percent graphitized carbon fibers and about 1 weight percent glass fibers of different lengths in accordance with the present invention.

An investigation was then undertaken to evaluate whether glass fiber length had any significant effect of resistivity. For this purpose, polypropylene specimens were prepared to contain about 1 volume percent of the PR-19-HT graphite fibers and about 1 weight percent of glass fibers obtained from Johns Manville. The glass fibers were compositionally identical to those used in previous investigations and had the same nominal diameter (about 14 micrometers) as before, but were processed to have nominal lengths of either about 3.2, 4.8, 6.4 or 12.8 mm. Specimens were also prepared without the addition of glass fibers (zero length). FIG. 4 shows that resistivity generally decreased with increased glass fiber length. Resistivities were measured in the flow, thickness and cross direction of the composites, each of which were fabricated by mixing with the Brabender mixer and injection molding with the MiniMax molder. As in FIG. 2, resistivities in the thickness direction were more than an order of magnitude higher than that in the flow direction. Moreover, the resistivities in the cross direction were considerably higher than in the thickness direction. Despite the usual experimental scatter, all data sets agreed that resistivity decreases as glass fiber length increases.

The effect on resistivity of using glass fibers of different diameters was also investigated, with the data summarized in the table below. All specimens were polypropylene (PP) composites containing about 1 volume percent of the PR-19-HT graphite fibers mixed with about 1 weight percent chopped glass fibers. The glass fibers were of three different types: the 14 micrometer-diameter (3.2 mm length) fibers used in the previous investigations; identical 14 micrometer-diameter fibers ball-milled with three steel balls for about five minutes in a Spex 8000 Mixer/Mill (Spex Industries, Inc.), producing roughly one cm-diameter clumps of networked fibers whose average length was about 200 micrometers; and glass microfibers having a nominal diameter of about 0.29 micrometer and various lengths, obtained from Evanite Fiber Corp.

The results shown in the table evidence that the glass fiber diameter had a greater effect on resistivity (in Ohms×cm) than glass fiber length.

Resistivities of 1 wt. % Glass Fiber/1 vol. % Pyrograf Fiber/PP Composites

|  | 14 µm | Ball-milled | 0.29 µm |
| --- | --- | --- | --- |
| Flow direction | 1212 | 47 | 48 |
| Cross direction | 47,826,459 | 18,666,025 | 11,539,572 |
| Thickness direction | 113236 | 493 | 747 |

An extensive survey of the fracture surfaces of polypropylene composite specimens containing both graphite fibers and glass fibers was undertaken to ascertain reasons for the conductivity enhancement observed. SEM images of the fracture surfaces did not show graphite fibers present in unusual amounts on surfaces of glass fibers exposed by fracture. In addition, images of composite debris remaining after selective removal of the polypropylene matrix by low temperature oxidation showed relatively clean glass fibers surrounded by graphite fiber debris, with no particular segregation of the graphite fibers. However, optical microscopy on one-micrometer sections of polypropylene composite specimens revealed a possible reason for the conductivity enhancement associated with glass fiber additions. Images of specimens containing about 1 volume percent of the graphite fibers and about 1 weight percent of the 14-micrometer glass fibers evidenced that large quantities of graphite fibers had segregated to the surfaces of the glass fibers. It appeared that segregation was primarily to the polypropylene matrix near the fiber glass surface, and not to the glass surface itself. Such a conclusion is supported by the fact that graphite fibers were not visible on the glass fibers exposed on the fracture specimens, but remained imbedded in the polypropylene matrix. For the oxidation specimens, the graphite fibers apparently remained attached to the retreating polypropylene matrix, pulling away from the glass fiber surfaces. On this basis, examination by SEM of the fracture surface investigations would not have shown any graphite fiber segregation, while optical microscopy was capable of making this observation.

Figure 5:
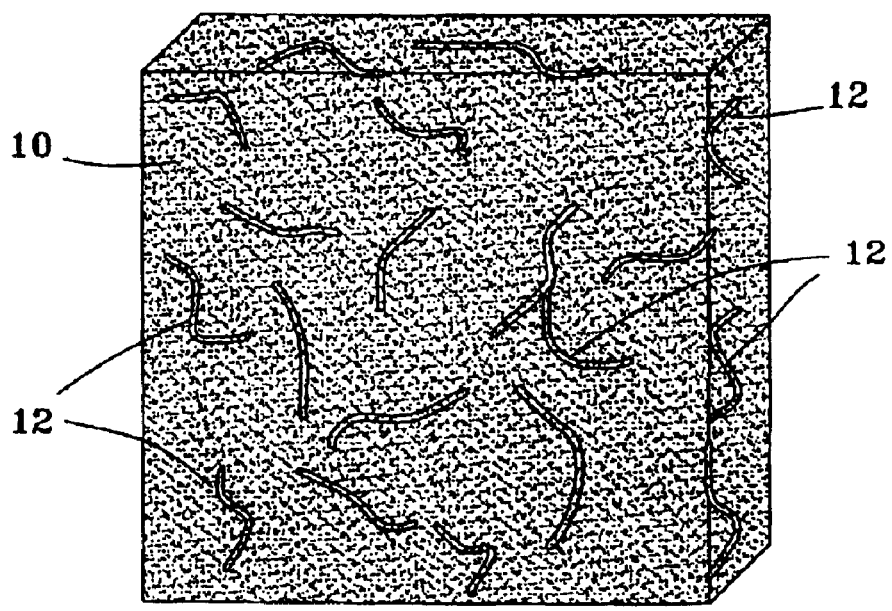
FIG. 5 represents a polymer-based composite in which graphitized carbon fibers are randomly dispersed in accordance with the prior art.
Figure 6:
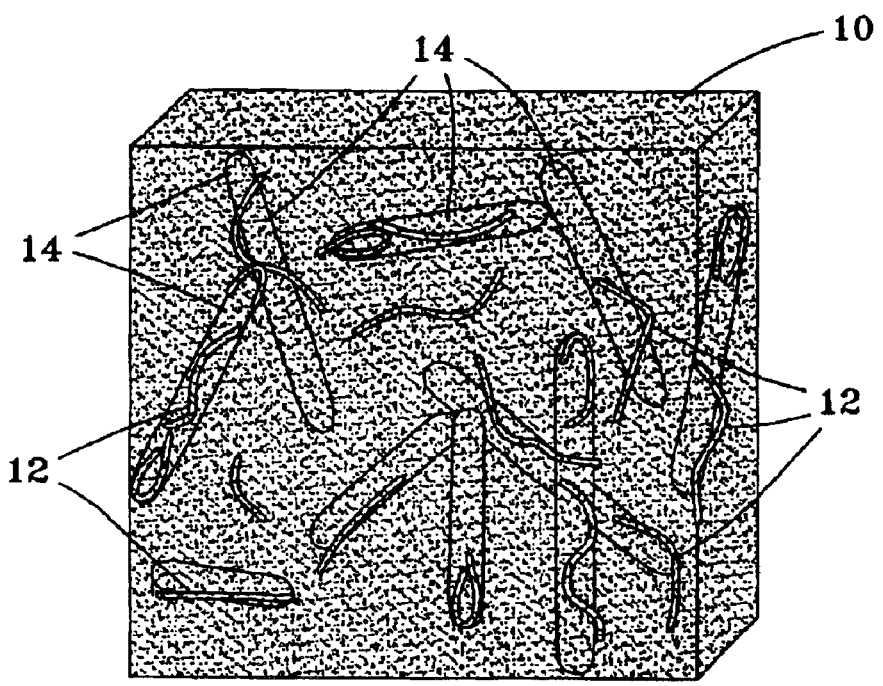
FIG. 6 represents a polymer-based composite in which graphitized carbon fibers and glass fibers are dispersed, and the carbon fibers are segregated at the glass fiber surfaces in accordance with an aspect of the present invention.

FIGS. 5 and 6 schematically represent how glass fiber addition is believed to be able to decrease resistivity based on the optical microscopy images. In FIG. 5, graphite fibers 12 are shown as being dispersed randomly in a polymer matrix 10, as is conventionally observed in carbon-filled polymer-based composites formed by injection molding techniques. In FIG. 6, which also represents a specimen formed by injection molding, the addition of glass fibers 14 is represented as having caused the graphite fibers 12 to segregate toward the interface between the polymer matrix 10 and glass fibers 14. The graphite fibers 12 are shown as being somewhat oriented or aligned along the lengths of the glass fibers 14. Because the glass fibers 14 are longer than the graphite fibers 12, segregation of the graphite fibers 12 in this manner is believed to increase the effective lengths of the graphite fibers 12, thus facilitating percolation of electric charges through the composite. This effect is consistent with the strong decrease in resistivity with increasing glass fiber length evidenced by FIG. 4, as the glass fibers 14 effectively become carbon-coated conducting fibers that are much longer than the graphite fibers 12. Decreasing glass fiber diameter is believed to improve composite resistivity more than increasing glass fiber length because smaller glass fiber diameters improve carbon fiber alignment. The improvement observed with the ball milled glass fibers is believed to be aided by the ball mill-induced clumping of the glass fibers, which, along with the graphite fibers, can subsequently form a conducting superstructure with high connectivity of the conducting elements. The fact that these two disparate techniques (microfibers and ball-milled glass fibers) achieved similar low resistivities suggested that a geometric optimum conductivity enhancement was being approached.

From the above, it can be appreciated that additions of as little as about 1 weight percent glass fibers to a polymer matrix containing graphite fibers can greatly reduce resistivities, and that sufficiently low resistivities for a variety of applications can be achieved with graphite fiber contents of as little as about 1 volume percent. Such an achievement is important in view of the difficulty of mixing and molding composites containing large amounts of fiber filler, as well as the low mechanical properties that can occur as a result of large residual stresses created during molding and subsequent cooling. The investigations reported herein showed that suitable results were achieved with thermoplastic-based composites containing about 1 volume percent of vapor-grown graphitized carbon fibers having diameters of less than one micrometer, and up to about 20 weight percent of chopped glass fibers longer than the carbon fibers, with glass fiber and carbon fiber contents of about 1 weight percent and about 1 volume percent, respectively, being suitable for many applications where resistivities of up to $10^6$ Ohm×cm and minimum fill levels are desirable or necessary. Further based on these investigations, it is believed that suitable results can be obtained with composites contain up to 50 weight percent of the glass fibers and up to 25 volume percent of the graphite fibers. To promote both mechanical and electrical properties, preferred composites contain about 1 to about 10 weight percent of the glass fibers and about 0.5 to about 5 volume percent of the graphite fibers. From the reported data, resistivities of about $10^3$ Ohm×cm and less (in the direction of flow) can be readily obtained simply by increasing glass fiber content, i.e., without increasing the carbon fiber content. In addition, preferred glass fibers have diameters of not larger than 25 micrometers and lengths of about 3 millimeters or more, preferably about 5 to about 15 millimeters. Various glass compositions may be used, and processing of the glass fibers may include chopping and/or milling, or any other methods that would cause the fibers to clump together. Various graphite (graphitized carbon) fibers may also be used, though fibers having diameters of about 0.2 micrometer and lengths of more than 2 micrometers (but shorter than the glass fibers) are believed to be preferred.

While the investigations described above made use of particular thermoplastic resins to form the polymeric matrices of the composite specimens, other thermoplastics could foreseeably be used, including polypropylene, nylon, TPO, and polycarbonate. The use of a thermoplastic resin permits extended shear mixing of the fiber/polymer mixture at temperatures that are sufficient to significantly reduce the viscosity of the mixture, thereby promoting the dispersion of the carbon and glass fibers and adhesion between the fibers and the polymer matrix. Furthermore, while the investigations made use of a low-shear MiniMax mixer and a relatively high-shear Brabender mixer, various other known types of equipment can be used to shear mix the mixtures of polymer, graphite fibers and glass fibers of this invention. The MiniMax and Brabender mixers used in the investigations are generally limited to processing small quantities of materials, while twin screw extruders and other high-volume shear mixing equipment are preferred for processing production quantities, though at high shear levels. Numerous other shear mixing and processing equipment and techniques could be employed that are also known to those skilled in the art. Generally, depending on the type of equipment used, the length of time over which the ingredients are shear mixed may vary so as to ensure that adequate mixing of the ingredients occurs. Finally, while an injection molder was used in the investigations, other forming techniques could be used, including compression molding techniques. However, because glass fiber orientation appears to have a beneficial effect on the conductive properties of the composites, forming operations that achieve or retain relatively parallel glass fiber orientation are preferred.

While the invention has been described in terms of a particular embodiments, it is apparent that other forms could be adopted by one skilled in the art. For example, processing parameters such as temperatures and durations could be modified, or appropriate materials could be substituted that possess required characteristics, or other processing methods could be employed that accommodate larger quantities of materials or to promote alignment of the fibers within the polymeric matrix. Accordingly, the scope of the invention is to be limited only by the following claims.

What is claimed is:

1. A method of making a composite article, the method comprising the steps of:
    shear mixing a mixture comprising a liquid polymeric material, graphitized carbon fibers having diameters of less than one micrometer, and glass fibers longer than the carbon fibers, the carbon fibers constituting up to about 25 volume percent of the mixture, the glass fibers constituting up to about 50 weight percent of the mixture;
    flowing the mixture into a mold so that the glass fibers are substantially oriented parallel to the direction of flow, the carbon fibers being substantially aligned with the glass fibers and preferentially segregating to regions of the polymeric material near interfaces between the polymeric material and the glass fibers in part as a result of the glass fibers being larger than the carbon fibers; and
    forming the composite article in the mold, the composite article having an electrical resistivity of not greater than $10^6$ Ohm×cm in the direction of flow.

2. A method according to claim 1, wherein the mixture contains not more than 20 weight percent of the glass fibers.

3. A method according to claim 1, wherein the mixture contains about 1 weight percent of the glass fibers.

4. A method according to claim 1, wherein the glass fibers have diameters of not larger than 25 micrometers.

5. A method according to claim 1, wherein the glass fibers have lengths of at least 3 millimeters.

6. A method according to claim 1, wherein the polymeric material is chosen from the group consisting of polypropylene, thermoplastic olefins, nylon and polycarbonate.

7. A method according to claim 1, wherein the carbon fibers have diameters of about 0.2 micrometer and lengths of more than 2 micrometers.

8. A method according to claim 1, wherein the carbon fibers are vapor-grown carbon fibers.

9. A method according to claim 1, wherein the mixture consists essentially of the polymeric material, the carbon fibers and the glass fibers.

10. A method for making a composite material containing vapor-grown graphitized carbon fibers in a polymeric matrix, the method comprising the steps of:
    shear mixing a mixture consisting essentially of the carbon fibers, a liquid thermoplastic material, and chopped glass fibers, the carbon fibers having diameters of less than one micrometer and constituting about 0.5 to about 5 volume percent of the mixture, the glass fibers being longer and having larger diameters than the carbon fibers and constituting about 1 to about 10 weight percent of the mixture;
    injecting the mixture into a mold so that the glass fibers are substantially oriented parallel to the direction of flow, the carbon fibers being substantially aligned with the glass fibers and preferentially segregating to regions of the thermoplastic material near interfaces between the thermoplastic material and the glass fibers in part as a result of the glass fibers being larger than the carbon fibers; and
    forming the composite article in the mold, the composite article having an electrical resistivity of not greater than $10^6$ Ohm×cm in the direction of flow as a result of the glass fibers are substantially oriented parallel to the direction of flow, and the carbon fibers are substantially aligned with the glass fibers and preferentially segregated to regions of the polymeric matrix formed by the thermoplastic material near interfaces between the polymeric matrix and the glass fibers.

11. A method according to claim 10, wherein the shear mixing step is performed with a twin screw extruder.

12. A method according to claim 10, wherein the mixture contains about 1 weight percent of the glass fibers.

13. A method according to claim 10, wherein the glass fibers have diameters of not larger than 25 micrometers.

14. A method according to claim 10, wherein the glass fibers have lengths of about 5 to about 15 millimeters.

15. A method according to claim 10, wherein the thermoplastic material is chosen from the group consisting of polypropylene, thermoplastic olefins, nylon and polycarbonate.

16. A method according to claim 10, wherein the carbon fibers have diameters of about 0.2 micrometer and lengths of more than 2 micrometers.

17. A method according to claim 10, wherein the mixture consists of the thermoplastic material, the carbon fibers and the glass fibers.

* * * * *